No. 776,306. Patented November 29, 1904.

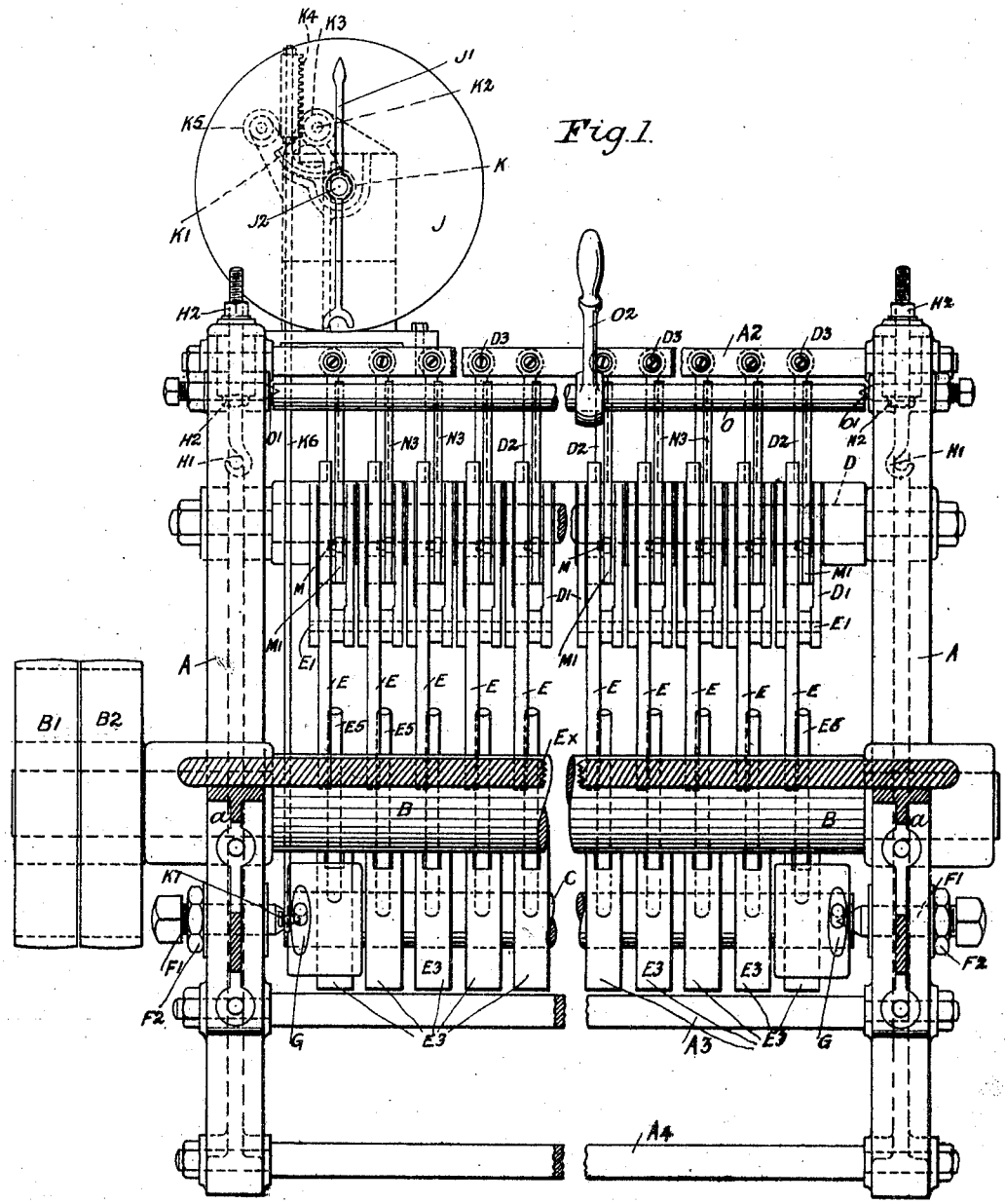

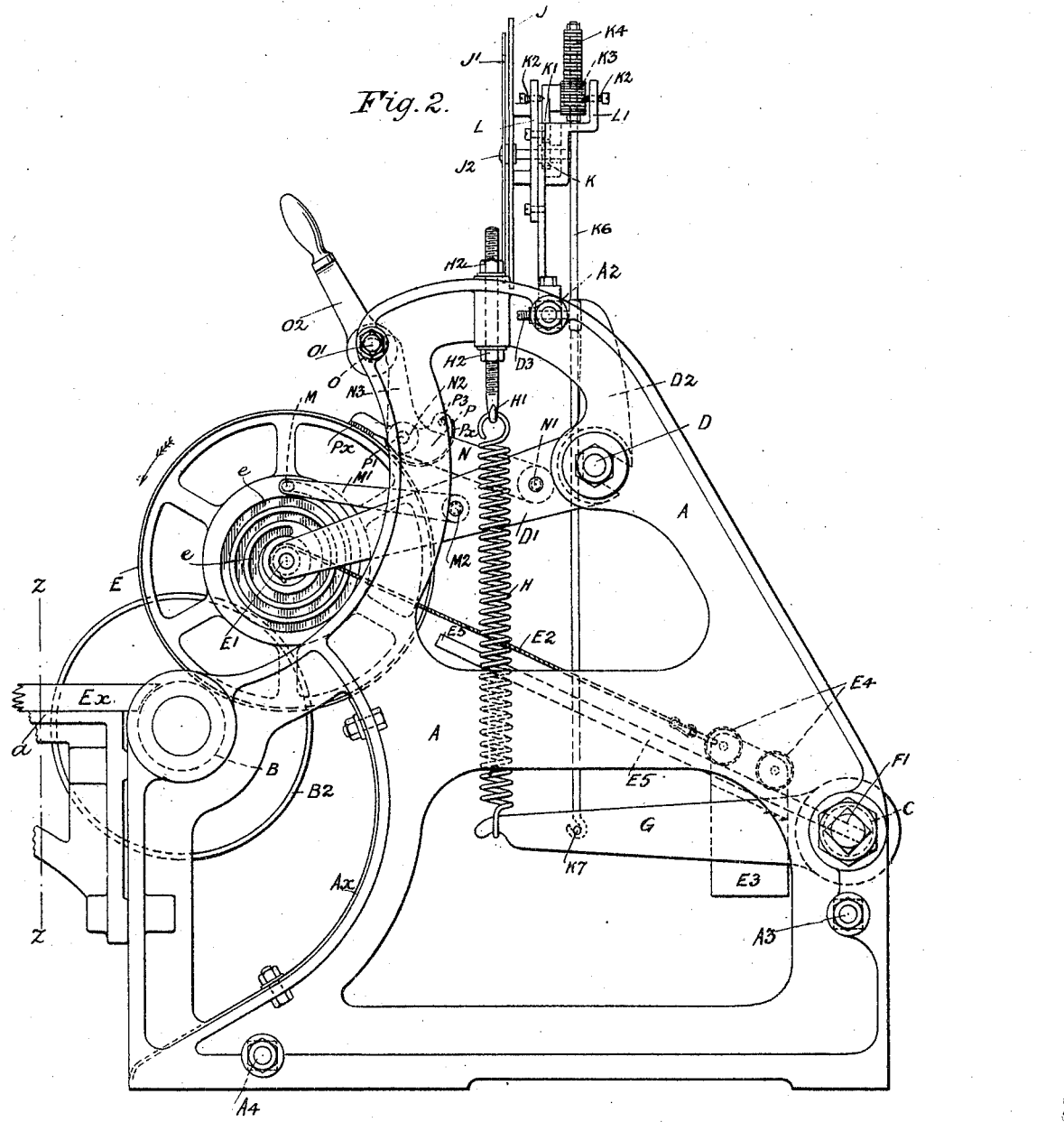

UNITED STATES PATENT OFFICE.

HARRY ALLSOP DUDGEON, OF LEICESTER, ENGLAND.

AREA-MEASURING MACHINE.

SPECIFICATION forming part of Letters Patent No. 776,306, dated November 29, 1904.

Application filed June 23, 1902. Serial No. 112,859. (No model.)

*To all whom it may concern:*

Be it known that I, HARRY ALLSOP DUDGEON, a subject of the King of England, and a resident of 87 Evington road, Leicester, in the county of Leicester, England, have invented certain Improvements in Machines for Measuring the Area of Leather and Like Articles of Irregular Figure, of which the following is a specification.

This invention relates to improvements in machines for measuring the area of irregular shapes—such, for instance, as skins from which leather for the uppers of boots and shoes are cut.

The invention is carried into effect by means of a series of measuring-rollers which are caused to rotate by the action of the skin or other substance of irregular shape passed under said rollers and over a feed-roller, the said measuring-rollers rotating only while in contact with the substance being measured. The said measuring-rollers are connected by cords or other suitable means to a series of movable weights, the latter being carried on arms attached to a rear shaft suitably carried by pivots or in bearings. As the measuring-rollers rotate they by means of the aforesaid cords or the like move the weights on the arms and create a tendency to revolve the rear shaft to which said arms are attached. The said shaft is prevented from turning by means of two levers mounted on it and having their forward ends connected to suitable springs, so that by means of a suitable gage any pressure on the springs (caused by the movement of the said weights and transmitted by means of the arms, rear shaft, and levers to the springs) can be made to register the number of square inches, feet, or yards in the article being measured.

Means are provided, as hereinafter described, to minimize or compensate for the error caused by the movement imparted to the measuring-rollers by the thickness of the material.

The invention will be fully understood from the following further description, having reference to the accompanying sheets of drawings, in which—

Figure 1 is a front elevation taken on the line $z\,z$ of Fig. 2 with certain parts removed, and Fig. 2 is a side elevation of the machine.

It will be seen that in Fig. 1 the machine is shown foreshortened; but it will be understood that there should be sufficient width between the two side frames to take the widest skins or substances to be measured.

An organized machine embodying this invention consists of two side frames A A, held together by the stretcher-bars $A^2\ A^3\ A^4$, and which side frames carry the feed-roller B, rear shaft C, and the shaft D, which carries the levers of the measuring-rollers, which said parts are hereinafter mentioned with relation to their respective parts of the machine.

The skin or other substance to be measured is fed over a table E, (supported on brackets $a\,a$,) the upper side of said table being disposed nearly level with the top of the feed-roller B, so that the substance to be measured is conveniently fed over the said feed-roller B, which latter has its bearings in the two side frames A A and carries on one end the fast and loose pulleys $B'\ B^2$.

The measuring-rollers E are adjusted, as hereinafter mentioned, to normally rest just clear of the feed-roller B, and the substance to be measured is passed, as before stated, over said feed-roller and under the said measuring-rollers E and then down round toward the front of the machine, following the course of the curved plate $A^\times$, which extends the width of the machine. The said plate $A^\times$ is not shown in Fig. 1, as it would have obscured certain parts.

The measuring-rollers E are mounted upon pins $E'$ in the bifurcated ends of a series of levers $D'$ approximately bell-crank shape. The said levers $D'$ have upward extensions $D^2$ to bear against adjusting-pins $D^3$, passed through the top stretcher-bar $A^2$, so that the measuring-rollers E may be normally kept from contact with the feed-roller B. Connected to the face or boss of each measuring-roller E is a cord or equivalent $E^2$, secured in any convenient way to a weight $E^3$, provided with pulleys $E^4$, which run upon an arm $E^5$ fixed on the rear shaft C, which said shaft is suitably mounted on pivot-pins $F'\ F'$, which are screwed into the side frames A A and provided with lock-nuts $F^2$ $F^2$, so as to maintain the freedom of said rear shaft C from friction. Fixed at each end of the said shaft C at the side of the frames A A are levers G, extending toward the front of the machine, and the ends of the said levers engage the lower ends of the springs H, (not shown in Fig. 1,) which have their upper ends engaged by the hooks H', the upper ends of which are screwed through the side frames A A and may be adjusted to tension the said springs H and are locked in position by means of the lock-nuts $H^2$ $H^2$.

From the foregoing description it will be seen that as the substance is carried between the feed-roller B and the measuring-rollers E and the latter are revolved the cords $E^2$ gradually draw the weights $E^3$ up the inclined arms $E^5$ and slightly revolve the rear shaft C, thereby lowering the front ends of the levers G and tensioning the springs H and through the medium of connecting mechanism hereinafter described will register on a dial the number of square inches, feet, or yards in the substance being measured. To this end the dial J has a pointer J', mounted on a pin $J^2$. Mounted on the pin $J^2$ is a spur-wheel K, which gears with a quadrant K', supported by the pivot-pins $K^2$ $K^2$, screwed into the plate L and bracket L', respectively. The boss of said quadrant has teeth $K^3$ cut thereon to engage a rack $K^4$, movable up and down and which is kept in gear with the pinion $K^3$ by means of a pulley $K^5$, this arrangement minimizing the friction. The said rack $K^4$ is connected by means of a rod $K^6$ to a pin $K^7$ on the side of the lever G.

For the purpose of restricting the forward and rearward movement of the weights $E^3$ on the arms $E^5$ the measuring-rollers E are each provided on their face with a differential cam-groove $e$ to receive therein a pin M on the end of a lever M', pivoted at $M^2$ in the bifurcated lever D', before mentioned.

Brakes are provided to prevent the measuring-rollers E from running back until released, each of which consists of a lever N, pivoted at N' in the bifurcated lever D', and said brake-lever N is provided with a boss at $N^2$ (to which is attached a brake-bit hereinafter mentioned) and said lever is provided with a vertical extension $N^3$, which passes upward to the rear of a shaft O, eccentrically carried on the pivot-pins O', which are screwed into the side frames A A. On said shaft O is fixed a hand-lever $O^2$, provided so that the operator by drawing it over toward him can simultaneously raise the brake-levers $N^3$ clear of the measuring-rollers E after each substance has been measured and will thereby allow the measuring-rollers and other parts to freely return to the zero position.

A further feature of this invention is the means adopted to compensate for the amount of movement imparted to the measuring-rollers E by the thickness of the material when first placed between said rollers and the feed-roller. When any substance is being placed under the rollers E to be measured, a movement of the measuring-rollers is caused by the thickness of the material, (independent of any length passed under the measuring-rollers,) the said movement being proportionate to the diameter of the measuring-rollers and the diameter of the feed-roller and the thickness of the substance. The compensation above mentioned is effected by means of a brake-bit P, mounted by means of a pin P' in a boss on the side of the brake-lever N, said brake-bit being provided at $P^x$ with leather facings $P^2$. It will be readily seen that as the measuring-roller E is revolved in the direction of the arrow in frictional contact with the facing $P^2$ on the tailpiece of the brake-bit the part $P^2$ rises from the roller E on its pivot P' a previously-determined amount, which is controlled by a stop-pin $P^3$ (on the tail of said brake-bit P) coming into contact with the edge of the lever N. It will be understood that the compensation is held in check until the skin or other substance clears the measuring-rollers, when the latter will immediately revolve in a reverse direction to their previous course for the amount of the predetermined distance—i. e., until the facing of the brake-bit bears upon the roller, as seen in Fig. 2, and checks its progress.

While I have mentioned in this specification and shown in the drawings the springs H to prevent the rear shaft D from turning except under the influence of the weights $E^3$, caused by the movements of the measuring-rollers, it is obvious that I may use various other means to effect the same end.

To use this measuring-machine, the measuring-rollers are so adjusted as not to touch the feed-roller, but so near as to come in contact with any substance passed between them, and so long as there is any substance between the feed-roller and any of the measuring-rollers then the latter will rotate. When the entire substance has passed through, all the measuring-rollers will have stopped and the pointer J' will indicate on the dial J the total area of the substance.

By the words "previously-determined amount," hereinbefore used, I wish to convey the meaning that I arrange my brake-bit P for what I take to be an average of the thicknesses to be measured, and the compensation is therefore the same amount for all slight variations in the thickness of the substance measured.

What I claim is—

1. In an area-measuring machine, in combination, a driven feed-roller, a series of measuring-rollers rotated by the substance being measured, levers carrying said measuring-rollers, a weight attached to each measuring-roller, a shaft and a series of inclined arms fixed therein along which the weights are drawn to partially turn said shaft, and means actuated by the latter for indicating the area of the substance measured, substantially as described.

2. In an area-measuring machine, in combination, a driven feed-roller, a series of measuring-rollers independently operated by the substance measured, a weight actuated by each measuring-roller, an inclined arm up which the weight is drawn, a shaft in which the arms are fixed and means to prevent the shaft turning except under the influence exerted by the movement of the weights, substantially as described.

In testimony whereof I have signed my name to this specification in the presence of two subscribing witnesses.

HARRY ALLSOP DUDGEON.

Witnesses:
T. S. SHOULER,
WALTER W. BALL.